United States Patent [19]

Kim

[11] Patent Number: 5,005,748
[45] Date of Patent: Apr. 9, 1991

[54] IMPEDANCE ROLLER STRUCTURE FOR VCR

[75] Inventor: Soo K. Kim, Seoul, Rep. of Korea
[73] Assignee: Goldstar Co., Ltd., Seoul, Rep. of Korea
[21] Appl. No.: 443,210
[22] Filed: Nov. 30, 1989
[30] Foreign Application Priority Data
Nov. 30, 1988 [KR] Rep. of Korea ............... 19647
[51] Int. Cl.$^5$ ............................................. B65H 20/00
[52] U.S. Cl. ........................................ 226/190; 242/76
[58] Field of Search ............... 242/76, 75.2; 226/190, 226/194, 168; 384/416, 418

[56] References Cited

U.S. PATENT DOCUMENTS 3,276,651 10/1966 Bryer ....................... 242/76 X
3,612,376 10/1971 Johnson ..................... 226/194
4,729,500 3/1988 Gwon ....................... 242/76 X

FOREIGN PATENT DOCUMENTS 0169117 7/1989 Japan ........................ 384/416
0568075 8/1977 U.S.S.R. ..................... 242/76

Primary Examiner—Daniel P. Stodola
Assistant Examiner—Paul Thomas Bowen
Attorney, Agent, or Firm—Birch, Stewart, Kolasch & Birch

[57] ABSTRACT

An impedance roller for use in VCR which includes an inertia spring damper member defining a plurality of inertia masses and a plurality of elastic members connected to each other and disposed between a hub and a roller boss of the impedance roller for absorbing the vibration of the tape so as to reduce the longitudinal vibration component of the tape.

2 Claims, 3 Drawing Sheets

IMPEDANCE ROLLER STRUCTURE FOR VCR

BACKGROUND OF THE INVENTION

1. Field of the Invention

The present invention relates to an impedance roller for use in a video cassette tape recorder (hereinafter "VCR") and more particularly, to an impedance roller for enabling to absorb and reduce the vibration of a tape by providing an inertia spring damper member defining a plurality of inertia masses and elastic members such as elastic rubber to the impedance roller on which the tape contacts and travels.

2. Description of the Prior Art

Various impedance rollers for use in the VCR deck mechanism serve as a tape guide which is structured with basic components so as to rotate by the frictional force of the tape. Therefore, such impedance rollers function for reducing the longitudinal vibration component of the tape by the inertia force according to the inertia moment of the impedance rollers.

As shown in FIG. 1, a conventional impedance roller 10 includes a shaft hole 10a disposed at the center portion thereof and a shaft fixed to a main chassis of the VCR deck at the one end and the other end, inserted to the shaft hole 10a for rotatably coupling.

FIG. 2 is a schematic diagram illustrating the operation of the conventional impedance roller 10 shown in FIG. 1 as the spring mass vibration system, wherein $K_1$ and $K_2$ are a spring constant according to the length up to a predetermined distance point of the tape wound around the impedance roller 10, M is an equivalent mass of the impedance roller, and F is a force transferred to the impedance roller 10 from the tape.

In the above-mentioned spring mass vibration system, since the impedance roller 10 is rendered to vibrate by the force F transferred by the longitudinal vibration and frictional force of the tape, the longitudinal vibration component of the tape becomes to reduce a certain degree by the inertia of the impedance roller 10.

However, although thus such impedance roller 10 having the above-described structure exhibits a certain reduction of the longitudinal vibration component, such impedance roller 10, in CUE/REV mode and ultra-high speed search playback mode thereof, is provided a travelling speed of the tape which is reached 3-12 times speed in a standard record and a playback mode and 9-36 times speed in a long time record and a playback mode relative to normal playback mode. Therefore, such impedance roller 10 has a problem that the longitudinal component vibration of the tape cannot be effectively reduced.

SUMMARY OF THE INVENTION

Accordingly, it is an object of the present invention to provide an improved impedance roller for use in a VCR.

Another object of the present invention is to provide an impedance roller which includes an inertia spring damper member defining an inertia mass and an elastic member connected to each other and disposed between a hub and a roller boss of the impedance roller for absorbing the vibration of the tape so as to reduce the longitudinal vibration component of the tape.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood form the detailed description given hereinbelow and the accompanying drawings which are given by way of illustration only, and thus are not limitative of the present invention, and wherein.

DESCRIPTION OF THE PREFERRED EMBODIMENTS

Figure 1:
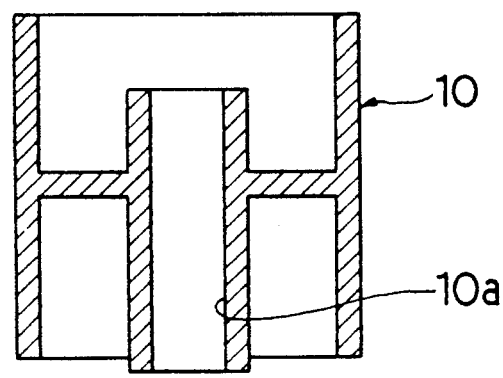
FIG. 1 is a sectional view showing a conventional impedance roller of a conventional VCR.
Figure 2:
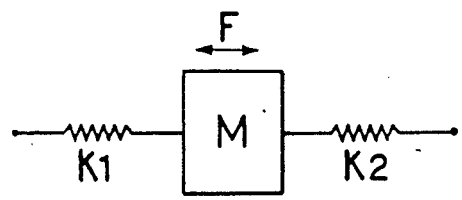
FIG. 2 is a schematic diagram illustrating a vibration system of the conventional impedance roller.
Figure 3:
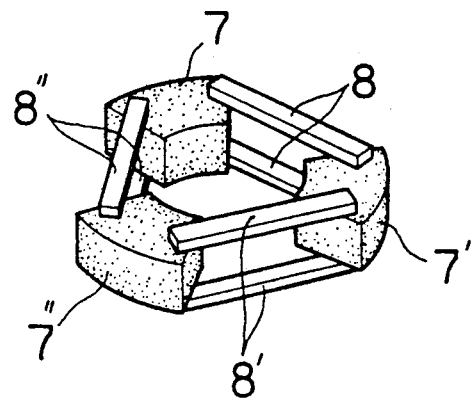
FIG. 3 is a perspective view of an inertia spring damper member of a impedance roller according to the present invention.
Figure 4:
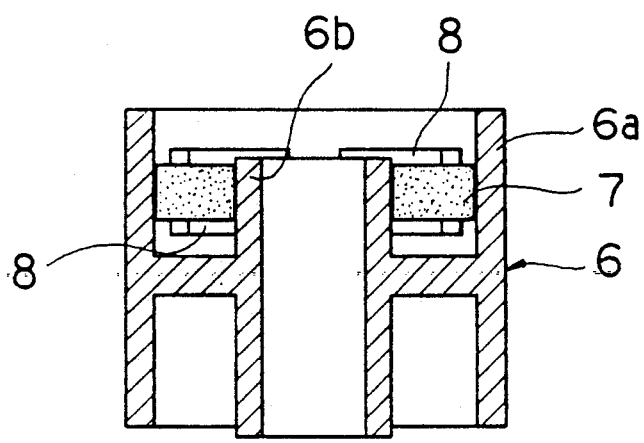
FIG. 4 is a sectional view showing of the impedance roller according to the present invention.
Figure 5:
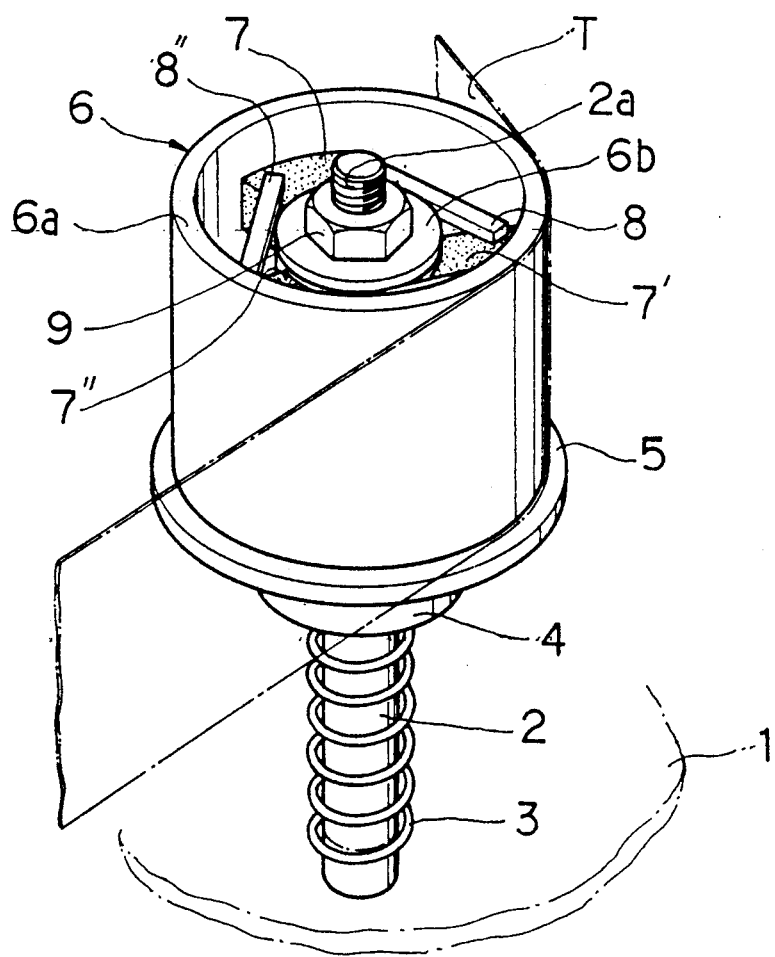
FIG. 5 is a perspective view for showing applying state of the impedance roller according to the present invention.

Referring now in detail to the drawings for the purpose of illustrating preferred embodiment of the present invention, the impedance roller for use in a video cassette tape recorder as shown in FIGS. 3, 4, and 5 comprises a main chassis 1, a shaft 2 supported on the side portion of the main chassis 1, a flange 5 having a boss 4 attached to the outside thereof for slidably receiving the shaft 2, a compression spring 3 wound around the shaft 2 and connected to the boss 4 at the top end thereof, and an impedance roller 6 supported by the flange 5.

The impedance roller includes a hub 6a for winding a tape T around the hub 6a, a roller boss 6b, and a nut 9 fastened to a screw 2a disposed the top portion of the shaft 2. An inertia spring damper member disposed between the hub 6a and roller boss 6b defines a plurality of inertia masses 8 and a plurality of elastic members 7 alternatively connected to each other, wherein the inertia masses 8 are attached to the top surface and the bottom surface of the elastic members 7, respectively. The elastic member 7 is made of elastic rubber.

Figure 8:
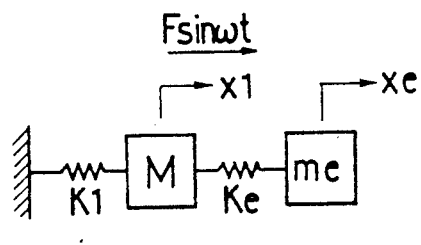
FIG. 8 is a schematic diagram illustrating a spring mass vibration system of a dynamic absorber according to the present invention.

In addition, a principle of the dynamic absorber related to the present invention is illustrated as follows:

FIG. 8 shows a spring mass vibration system of the dynamic absorber, wherein M represents a mass of vibration body, $m_e$ is a mass of the dynamic absorber, $x_1$ is an amplitude of the vibration body, and $x_e$ is an amplitude of the dynamic absorber.

The kinetic equation is represented by $$Mx_1 = -K_1x_1 - K_e(x_1 - x_e) + F \sin \omega t \quad (1)$$

$$m_e x_2 = -K_e(x_e - x_1) \quad (2)$$

Arranging above equations (1) and (2), they are represented by $$Mx_1 + (K_1 + K_e)x_1 - K_e x_e = F \sin \omega t \quad (3)$$

$$-K_e x_1 + m_e x_e + K_e x_e = O \quad (4)$$

And, solutions of equations (3) and (4) is represented by $$x_1 = X_1 \cdot \sin(\omega t - \phi 1) \quad (5)$$

$$x_e = X_e \cdot \sin(\omega t - \phi 2) \quad (6)$$

Substituting above equations (5) and (6) into equations (3) and (4), and solving differential equation, vibrations $X_1$ and $X_e$ of equation are given by following equations:

$$X_1 = \left| \frac{(K_e - m_e\omega^2)F}{(K_1 + K_e + M\omega^2)(K_e - m_e\omega^2) - K_2^2} \right| \quad (7)$$

$$X_e = \left| \frac{K_e F}{(K_1 + K_e - M\omega^2)(K_e - m_e\omega^2) - K_2^2} \right| \quad (8)$$

Therefore, when the amplitude of mass $x_1 = 0$, the vibration of the mass becomes minimum and accordingly, when $K_e - m_e\omega^2 = 0$, the vibration becomes minimum.

However, in the dynamic absorber, in case when a shaking force exerted to vibration body m is operated by the vibration frequency which almost equals to $$\sqrt{\frac{K_1}{M}}.$$

in order to minimize the vibration of vibration body m is aimed, at this time, when making $$\frac{K_1}{m} = \frac{K_e}{m_e},$$

the amplitude of vibration body becomes zero.

Figure 6:
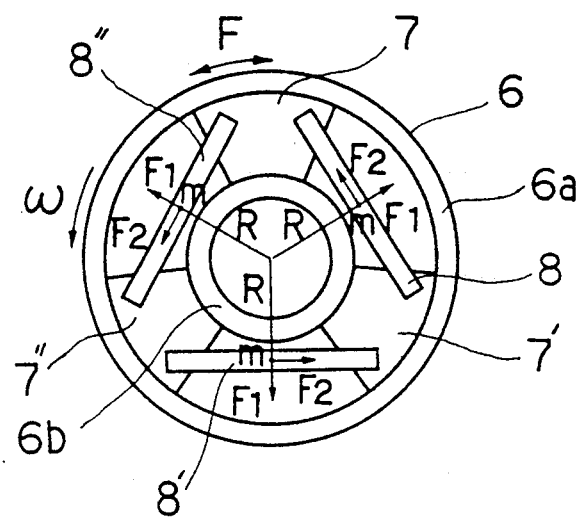
FIG. 6 is a top plan view of the impedance roller illustrating the operation according to the present invention.

The impedance roller 6 according to the present invention operates as follows:

As shown in FIG. 5, when the tape T travels with contacting at a constant speed as V with the impedance roller 6, the impedance roller 6 becomes to rotate at an angular velocity of $\omega$ according to the friction force of the tape T. Thus when the impedance roller 6 becomes rotated at an angular velocity of $\omega$, as shown in FIG. 6, the force F causing from travelling frictional force of the tape T and longitudinal vibration component is transferred to the impedance roller 6, consequently the centrifugal force F1 and the inertia force F2 are exerted at the mass center of the mass m of the inertia masses 8, in elastic members 7, fixed by adhering between the hub 6a and the boss 6b of the impedance roller 6.

Figure 7:
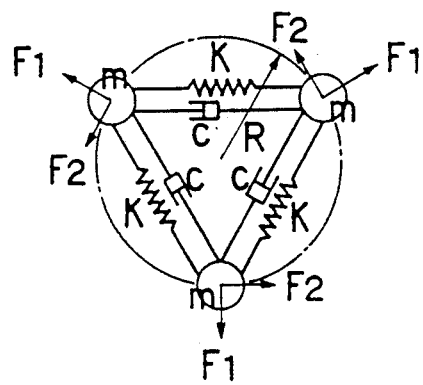
FIG. 7 is a schematic diagram of the inertia spring damper member according to the present invention.

FIG. 7 shows a spring mass vibration system of the inertia spring damper member defining elastic members 7, and the plurality of inertia masses 8, wherein the elastic members 7 are of the spring damper member having the spring constant K and the damping coefficient C, and R represents distance between the centroid of the inertia masses and the shaft center.

Figure 9:
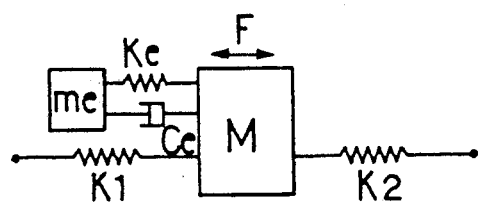
FIG. 9 is a schematic diagram illustrating a vibration system of the impedance roller according to the present invention.

FIG. 9 shows a function of impedance roller vibration system according to the present invention which illustrates the function of the vibration system in case of attaching the vibration system of the inertia spring damper member as shown in FIG. 7 to the impedance roller 6 having the mass M.

That is, the plurality of elastic rubbers 7, are represented by the equivalent spring constant $K_e$ and dampening coefficient $C_e$, and a plurality of inertia masses 8 are represented by equivalent mass $m_e$ whereby showing to execute the function of mass spring damper system attached to mass M of impedance roller 6.

Therefore, when the shaking force F is exerted to the impedance roller 6 to vibrate the mass M, mass $m_e$ connected with damper and spring consisted of spring constant $K_e$ and damping coefficient $c_e$ to the mass M becomes to vibrate, so as to absorb the vibration of mass M as a whole.

According to the present invention as described above, the inertia spring damper member is constituted to the impedance roller so that not only there is advantage that vibration of tape is effectively absorbed, but also particularly in the CUE/REV mode and the high speed searching mode that travelling speed of the tape is faster than the normal playback mode, there is effect that inferiority such as trembling and flowing of the screen according to the vibration of the tape is can be eliminated.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An impedance roller mounted to main chassis for use in a video cassette tape recorder, which comprises:
    a roller for guiding a tape of said video cassette tape recorder, said roller including a roller hub and a roller boss disposed at a top portion thereof,
    a roller shaft attached to said roller at an upper portion thereof, said roller shaft supported on said main chassis,
    a flange disposed at an outer bottom edge of said roller for preventing the tape from separating from the roller,
    a main boss attached to a bottom of said roller,
    a compression spring wound around a lower portion of said roller shaft from said main boss, and
    an inertia spring damping member disposed between said roller hub and said roller boss, said inertia spring damping member including:
    a plurality of elastic members and
    a plurality of inertia masses alternatively connected to
    each other, said inertia masses attached to a top surface and
    a bottom surface of said plurality of elastic members, whereby the impedance roller enables to absorb and reduce the vibrations to the tape so that the disadvantages such as trembling and flowing of the screen according to the vibrations of the tape can be eliminated.

2. The impedance roller of claim 1, wherein the plurality of elastic members are made of elastic rubber.

* * * * *